(12) United States Patent
Kusaka et al.

(10) Patent No.: US 6,806,671 B2
(45) Date of Patent: Oct. 19, 2004

(54) POWER SUPPLY SYSTEM AND POWER SUPPLY METHOD

(75) Inventors: Yasushi Kusaka, Susono (JP); Kimitoshi Tsuji, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 121 days.

(21) Appl. No.: 10/243,658

(22) Filed: Sep. 16, 2002

(65) Prior Publication Data

US 2003/0057908 A1 Mar. 27, 2003

(30) Foreign Application Priority Data

Sep. 25, 2001 (JP) ........................................ 2001-290690

(51) Int. Cl.$^7$ .............................. H02P 1/54; H02P 7/80; H02J 7/04; H02J 7/16
(52) U.S. Cl. ....................... 318/442; 318/109; 318/108; 320/140
(58) Field of Search ............................... 318/442, 139, 318/376, 109, 108, 500; 320/119, 123, 140, 145, 149; 307/18, 28

(56) References Cited

U.S. PATENT DOCUMENTS

| | | | | |
|---|---|---|---|---|
| 5,151,641 A | * | 9/1992 | Shamoto ..................... | 318/762 |
| 5,350,994 A | * | 9/1994 | Kinoshita et al. ........... | 320/123 |
| 6,058,032 A | * | 5/2000 | Yamanaka et al. .......... | 318/768 |
| 6,066,928 A | | 5/2000 | Kinoshita et al. ........... | 318/139 |
| 6,396,244 B2 | * | 5/2002 | Shamoto et al. ............ | 320/119 |
| 6,476,571 B1 | * | 11/2002 | Sasaki ........................ | 318/139 |

FOREIGN PATENT DOCUMENTS

| JP | | 05244704 A | * | 9/1993 | ........... B60L/11/18 |
|---|---|---|---|---|---|
| JP | A | 2000-324857 | | 11/2000 | |

* cited by examiner

*Primary Examiner*—Shih-Yung Hsieh
*Assistant Examiner*—Edgardo San Martin
(74) *Attorney, Agent, or Firm*—Oliff & Berridge, PLC

(57) ABSTRACT

Power from a high voltage battery (10) (for example 36V) is supplied through an inverter (12) to a motor generator (14). A low voltage battery (20) (for example 12V) is connected through a reactor (18) to the neutral point of the motor generator (14). A voltage ratio of the low voltage battery (20) to the high voltage battery (10) is preferably from 1:2 to 1:4. In order to set the neutral point voltage to a desired charging voltage into the low voltage battery (20), the inverter (12) is controlled so as to follow a current distortion phenomenon. In this way, in a dual-power source system with a voltage ratio of a low voltage battery (20) to a high voltage battery (10) between 1:2 and 1:4, voltage switching means for use in charging a charge voltage of a high voltage side into a low voltage source can be implemented at low cost.

14 Claims, 16 Drawing Sheets

RELATED ART CONFIGURATION

POWER SUPPLY SYSTEM AND POWER SUPPLY METHOD

BACKGROUND OF THE INVENTION

1. Field of the Invention

The present invention relates to a power supply system, provided with a current supply system having a high voltage system and a low voltage system, for driving a motor with power from the high voltage system.

2. Description of the Related Art

Conventionally, internal combustion engines (engines) using fuel such as gasoline have been widely used as a source of power for vehicles. Various types of device are installed in this type of vehicle, and a lot of these devices are driven by electrical power. Vehicles are therefore fitted with a battery, and various electrical devices mounted in the vehicle are powered by electrical power from this battery.

Some of these types of vehicle mounted electrical components have comparatively large power consumption, such as motors such as starter motors, air conditioner motors, power steering motors etc., or various heaters. Electrical power of electrical devices is determined by multiplying voltage by current. With large power devices, if the source voltage is low, then a large current must flow to obtain large amounts of power, but the power consumed by comparatively low resistances such as the internal resistance of the battery and wiring can not be ignored, and there is also a large amount of loss in the motor and an inverter driving the motor. There is therefore a demand to make battery voltages high.

Also, hybrid vehicles and the like use a motor for traveling and for engine torque assist. With this type of system, a high voltage battery that efficiently drives such motors is desired.

Generally, in vehicles power is supplied to vehicle mounted components by fitting a battery capable of driving ancillary device loads of about 14V–1 kW, but when using large power devices such as those described above, there is a strong demand to use a higher voltage power source.

It has therefore been proposed to provide a low voltage 12V battery for the low power devices, and a high voltage battery, for example a 36V battery, as a separate battery for the large power devices.

This type of system is constructed as shown, for example, in FIG. 18, having a 36V battery B1 connected via an inverter INV to a motor generator M/G, and also connected to another 42V system load LD1. The 36V battery B1 is also connected via a DCDC converter CONV to a 12V battery B2 and a 14V load LD2.

Accordingly, the 42V load LD1 and the motor generator M/G are driven using high voltage power from the 36 V battery B1, while the generated output of the motor generator M/G is used as charging power for the 36V battery B1.

On the other hand, high voltage power from the 36V battery B1 is converted to 14V by the DCDC converter CONV to charge the 12V battery B2, and then the 14V load LD2 is driven by 14V supply from the 12V battery B2.

There is also a demand to efficiently charge each of the power supplies with this type of 42–14V dual power supply system having both a 36V and a 12V battery. It is also possible to provide two generators respectively corresponding to each power supply, but it is difficult to keep the cost of a system having two generators down. It has therefore been considered to charge one power supply with a voltage generated from one generator, and then charge the other power supply by subjecting this generated voltage to voltage conversion, but in order to do this, a DCDC converter is required.

For example, in a dual power supply system such as that disclosed in Japanese Patent Laid-Open No. 2000-324857, a dedicated DCDC converter circuit is provided for carrying out voltage conversion between the two power supplies. A high voltage of a few hundred volts is converted using this dedicated DCDC converter, to charge a low voltage battery (a 12V battery).

However, by providing the dedicated DCDC converter circuit, the overall cost of the dual power supply system is increased significantly. In particular, in the case where a voltage ratio of two power supplies is not as large as that disclosed in Japanese Patent Laid-Open No. 2000-324857, such as a system provided with a 42V power supply and a 14V power supply, since a requirement with respect to voltage conversion range is not so large, it is desirable to realize a voltage conversion function at as low a cost as possible.

SUMMARY OF THE INVENTION

It is an object of the present invention to provide a system with an output voltage ratio of two power supplies that is not too large (for example, low voltage:high voltage=1:2–1:4), such as a 42V–14V type power supply, at low cost.

The present invention is a power supply system provided with a high voltage system and a low voltage system, comprising an a.c. motor that is a load on the high voltage system and is driven by a high voltage power source, an inverter for controlling supply of power to the a.c. motor, a low voltage system supply path for applying a neutral point voltage of the a.c. motor to a load of the low voltage system, and a load of the low voltage system for connecting to the low voltage system supply path, wherein a voltage ratio of the low voltage system to the high voltage system is set to from approximately 1:2 to approximately 1:4.

By having the high voltage system and the low voltage system, it is possible to obtain an appropriate supply voltage according to the load to be driven, to efficiently drive the load. By connected the high voltage system and the low voltage system through the a.c. motor, there is no need for a DCDC converter, which enables simplification of the system and reduction in cost. Further, by having the voltage ratio of the low voltage system to the high voltage system in a range of 1:2 to 1:4, it is also possible to maintain efficient drive of the a.c. motor.

It is also preferable to control power supply to the a.c. motor using an inverter so that the voltage ratio of the low voltage system to the high voltage system is a specified value between 1:2 and 1:4. In this way, it is possible to effectively control neutral point voltage.

It is also possible to make the voltage ratio of the low voltage system and the high voltage system approximately 1:3.

Because the voltage ratio of the low voltage system to the high voltage system is made a specified value between 1:2 and 1:4, it is possible to perform control so that an a.c. component in output from the inverter is not a sine wave shape, but follows a current distortion phenomena.

It is also preferable for the a.c. motor to be a motor for generating vehicle traveling force or a motor for starting an engine.

It is further preferable to have a relay for opening and closing the low voltage supply path, and determining means for determining whether or not inverter control for making the voltage ratio a specified value is appropriate, with the relay being opened if it is determined by the determining means that control is inappropriate.

By providing the relay in this way, the low voltage system is disconnected as required, and it is possible to ensure efficient drive of the a.c. motor.

It is also preferable for the determining means to determine whether or not the a.c. motor attains the required output force.

It is also preferable for the determining means to determine whether or not efficiency of the a.c. motor is as specified or better. p It is still further preferable, when opening or closing the relay, to change a motor output command so as to control a.c. motor output variations attributable to variations in neutral point voltage based on opening and closing of the relay.

It is further preferable, when opening or closing the relay, to open or close the relay after controlling the neutral point voltage to zero.

It is also preferable to have a return diode, connected from the low voltage system to the high voltage system, for returning power from the low voltage system to the high voltage system.

The present invention is also directed to a power supply method in system having an a.c. motor driven by a high voltage power source, and an inverter for controlling supply of power to the a.c. motor, provided with a high voltage system and a low voltage system for connecting a neutral point of the a.c. motor to a load of the low voltage system as a low voltage system power source, wherein a voltage of the low voltage system is made a specified value of between about ½ to about ¼ of the voltage of the high voltage system, and the inverter is controlled so that a current distortion phenomenon is caused in the generated voltage waveform at least at the time of motor generation.

A voltage ratio of about 1:2 or about 1:4 indicates a voltage ratio in a range of from 1:2 to 1:4 even taking into consideration an error.

DESCRIPTION OF PREFERRED EMBODIMENTS

Embodiments of the present invention will be described below based on the drawings.

Figure 1:
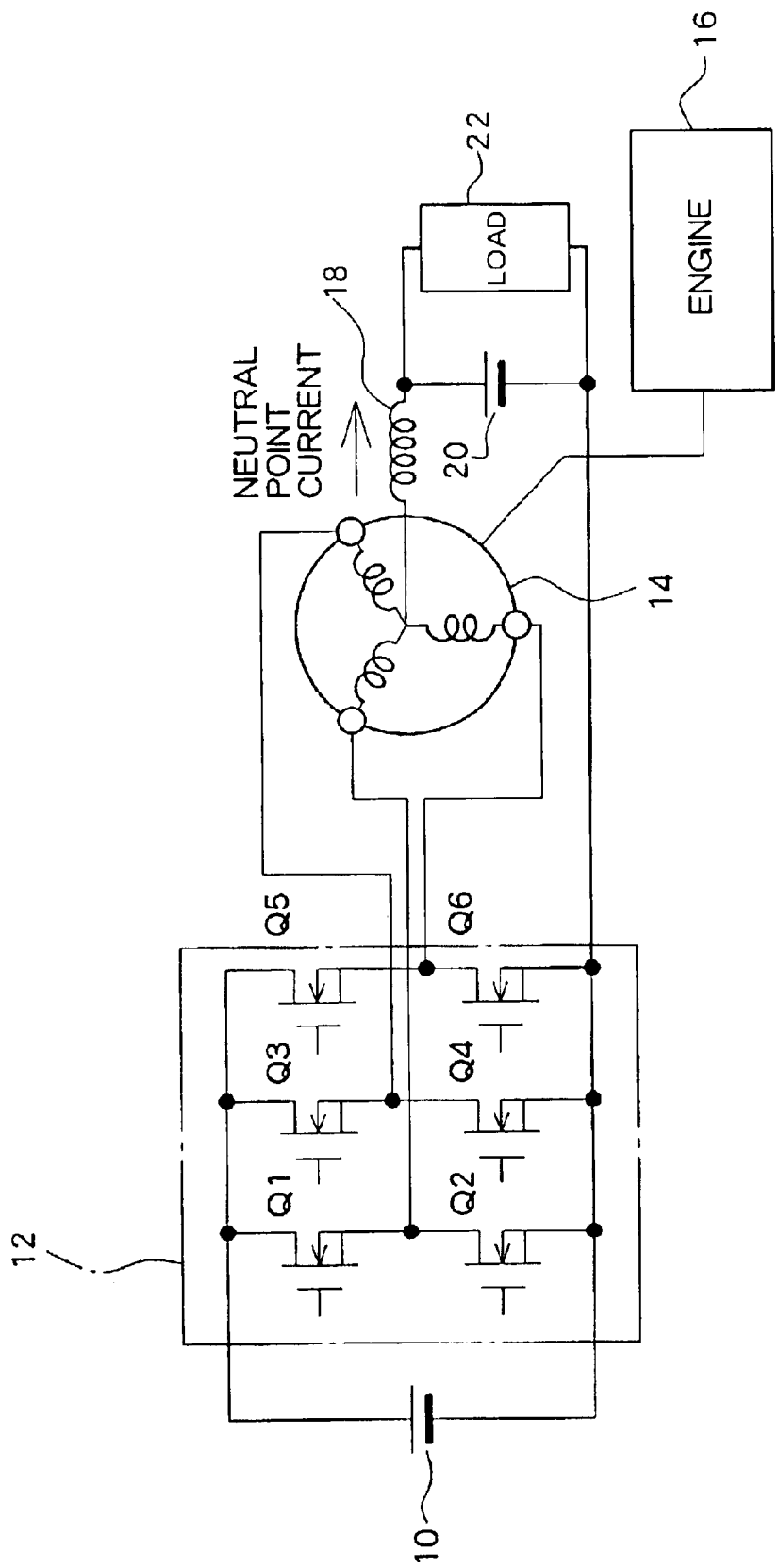
FIG. 1 is a drawing showing the structure of an embodiment.

FIG. 1 is a drawing showing the structure of a first embodiment, in which both ends of a high voltage (36V) battery 10 are connected to an inverter 12. A negative electrode of the high voltage battery 10 is connected to earth, such as the vehicle body, while the positive electrode constitutes a power source line. Secondary batteries such as nickel hydrogen or lithium ion batteries are used in the high voltage battery 10.

The inverter 12 is made up of six switch elements (N-channel transistors). Specifically, a U phase arm constituted by transistors Q1 and Q2 connected in series, a V phase arm constituted by transistors Q3 and Q4 connected in series, and a W phase arm constituted by transistors Q5 and Q6 connected in series is arranged between the power source line and earth. Intermediate points of each phase arm of the inverter 12 are connected to respective ends of respective phase coils of a three phase motor generator 14. Specifically, one end of the three U, V and W phase coils of the motor generator 14 are commonly connected at a neutral point, then the other end of the U phase coil is connected to an intermediate point of transistors Q1 and Q2, the other end of the V phase coil is connected to an intermediate point of transistors Q3 and Q4, and the other end of the W phase coil is connected to an intermediate point of transistors Q5 and Q6.

Accordingly, by repeating operations of sequentially turning on lower transistors in two of the three phases while an upper transistor in the remaining phase is on, and sequentially changing the arm whose upper transistor is on, it is possible for three phase current with each current differing in phase by 120 degrees to flow in a three phase coil.

Also, an engine 16 is connected to an output shaft of the motor generator 14, the motor generator 14 operates as a generator driven by the engine 16 and generates three-phase electrical power at ends of the three phase coils. The motor generator 14 also functions as a generator at the time of regenerative braking of the vehicle.

A positive electrode of a low voltage (12V) battery 20 is then connected through a reactor to a motor neutral point where the three phase coils of the motor generator 14 are connected in common. A negative electrode of the low voltage battery 20 is connected to earth. This low voltage battery is also made up of secondary batteries (for example, lead storage batteries). A load (various ancillary devices) 22 of a 14V system is connected to this low voltage battery 20, and power is supplied to the load 22 from the low voltage battery 20.

The potential of the motor neutral point is half of the voltage usually applied to the motor (almost the same as a voltage value of the high voltage battery 10). This is because a voltage across the earth and the power source line is applied to the motor generator 14. This voltage varies in amplitude depending on output torque of the motor generator 14, but with this embodiment supply of current to the motor generator 14 is controlled using PWM control. Effective motor current control is therefore realized by controlling the duty cycle of the supplied current.

With this embodiment, by causing the duty cycle of the upper transistors (Q1, Q3, Q5) and the lower transistors (Q2, Q4, Q6) of the inverter 12 (on period duty cycle) to differ, the neutral point voltage is controlled to a desired value. That is, with this embodiment, a voltage (VBm) for charging the high voltage battery 10 is 42V and a voltage (VBs) for charging the low voltage battery 20 is 14V. Accordingly, if the duty cycle of the upper transistors and the lower transistors is the same, the motor neutral point voltage becomes 21V. However, with this embodiment, the on period of the lower transistors is set to double the on period of the upper transistors, which means that the neutral point voltage is controlled to 14V.

Operation of a dual power source system having a high voltage system (42V) and a low voltage system (14V) will now be described.

In the two power source system of FIG. 1, a neutral point voltage appearing at the motor neutral point is varied between 0V–VBm (source voltage) according to switching states of the transistors Q1–Q6 of the inverter 12. A reactor is appended to the neutral point in order to make the average voltage of this neutral point equal to an average value Vn of the motor applied voltage, and by controlling the average value Vn it is possible to supply power at a fixed generated voltage (neutral point voltage) to the low voltage battery 20.

Direct current flowing in the neutral point at this time is the same in the three phases of the motor generator 14, and as a result magnetic fluxes cancel each other out and the neutral point current has almost no effect on the control of the motor generator 14.

Figure 2:
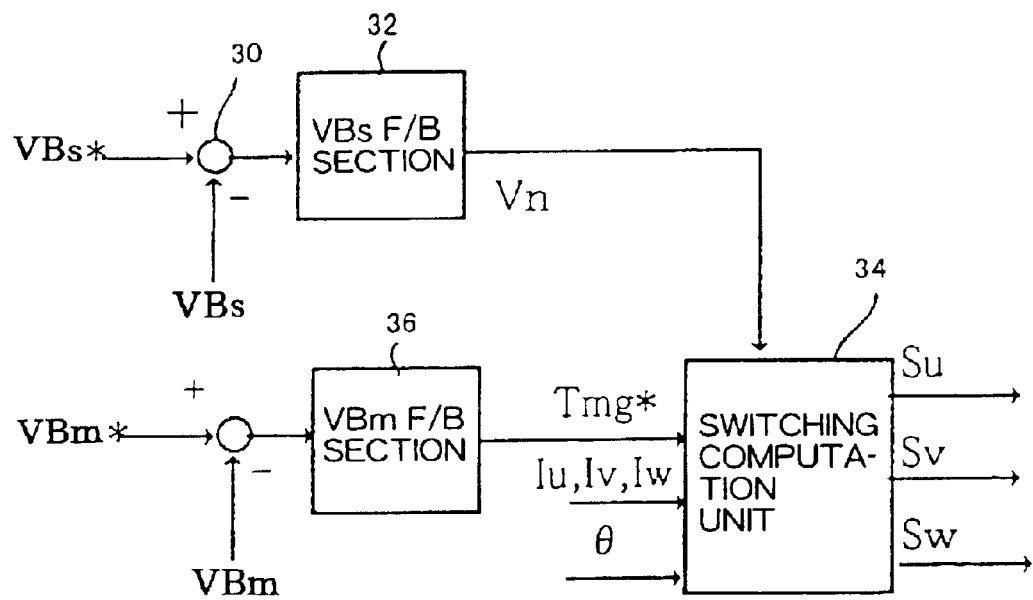
FIG. 2 is a block diagram of inverter control.

Therefore, when charging the high voltage battery 10 or the low voltage battery 20 (generation operation of the motor generator 14), control using the configuration of FIG. 2 is possible. The configuration of FIG. 2 will now be described.

First of all, the voltage of the high voltage battery 10 is taken to be VBm, a voltage command value for the high voltage battery 10 is taken to be VBm*, the voltage of the low voltage battery 20 is taken to be VBs, a voltage command value for the low voltage battery 20 is taken to be VBs*, an average applied motor voltage for the motor generator 14 is taken to be Vn, and a torque command value for output torque of the motor generator 14 is taken to be Tmg*.

VBs* and VBs are input to a subtracter 30, and a difference between the two is calculated. An obtained difference between the command value VBs* and the actual voltage VBs is supplied to a VBs feedback section 32. The VBs feedback section 32 determines Vn so that the voltage value Vbs of the low voltage battery 20 becomes the command value VBs* for that voltage, and Vn is supplied to a switching computation unit 34.

Also, The voltage command value Vbm* and the actual voltage VBm for the high voltage battery 10 are supplied to a subtracter 36 and a difference between the two is calculated. An obtained difference between the command value VBm* and the actual voltage VBm is supplied to a VBm feedback section 36. The VBm feedback section 36 determines Tmg* corresponding to the generated output power of the motor generator 14 so that the voltage value Vbm of the high voltage battery 10 becomes the command value VBm* for that voltage, and Tmg* is supplied to the switching computation unit 34. Respective phase currents Iu, Iv and Iw of the motor generator 14, and a detection signal θ for rotor position, are also input to the switching computation unit 34.

The switching computation unit 34 then creates and outputs switching control signals Su, Sv and Sw for the transistors Q1–Q6 of each phase arm of the inverter 12 based on these input signals, so that Vn becomes the value supplied from the VBs feedback section 32 and the output torque of the motor generator 14 becomes Tmg*.

As described above, with this embodiment, Vn is offset from ½ VBm. By making the on duty cycle of the lower transistors of the inverter 12 large compared to the on duty cycle of the upper transistors, Vn is controlled so as to be lower than ½ VBm.

Here, it is sometimes not possible to make sufficient use of voltage depending on the voltage ratio of the two power sources. When the voltage ratio is kept at 1:2, the neutral point voltage becomes VBm/2, which means that normal operation of the motor generator 14 is made possible. However, if the voltage ratio is offset from 1:2, as with this embodiment, a problem arises with lowering of maximum output and efficiency of the motor generator 14.

Figure 3:
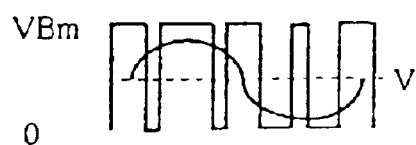
FIGS. 3(a) and 3(b) are drawings showing a motor voltage waveform at the time of control.
Figure 3:
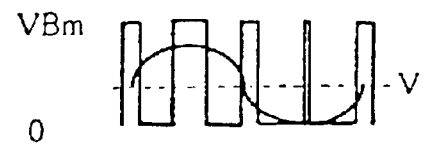

The relationship between motor neutral point voltage and the motor voltage waveform is shown in FIG. 3. When the voltage ratio of the high voltage battery 10 and the low voltage battery 20 is 2:1 (neutral point voltage=VBm/2), then as shown in FIG. 3(a), and similarly to the motor control of the related art, switching control is performed to make the average duty cycle of the upper transistors and the lower transistors 50%, and it is possible to sufficiently utilize the d.c. voltage as in the related art even if there is an increase in amplitude of the fundamental wave of the applied voltage with increase in rotational speed etc.

On the other hand, when the voltage ratio is 3:1, as with this embodiment, the center of motor voltage with an average duty cycle of about 33%, having the lower transistor on period double compared to the upper transistors, becomes ⅓ VBm. As shown in FIG. 3(b), therefore, if amplitude of the applied fundamental wave is increased and minimum voltage exceeds a lower limit value 0, the lower side of the voltage waveform is clamped to voltage 0, the voltage AC components are no longer sinusoidal and the effective value of the fundamental wave is also lowered. Specifically, the on duty cycle of the upper transistors has a margin, but the on duty cycle of the lower transistors at this time cannot be further increased.

Figure 4:
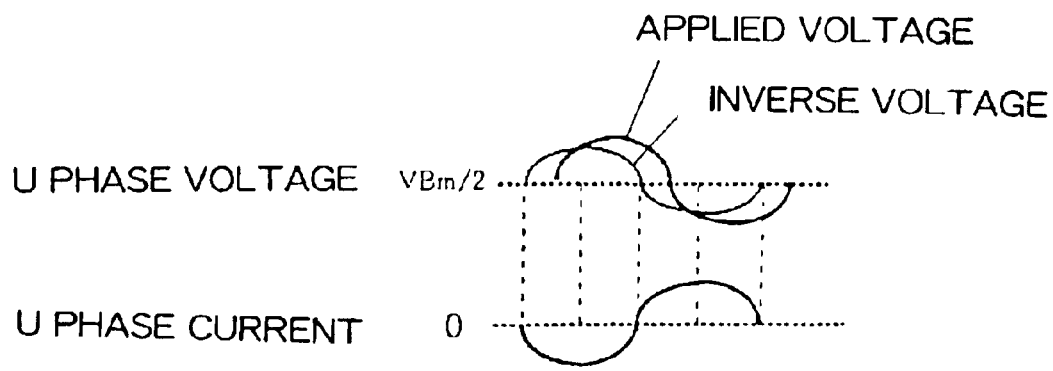
FIGS. 4(a) and 4(b) are drawings showing a motor current distortion phenomenon.
Figure 4:
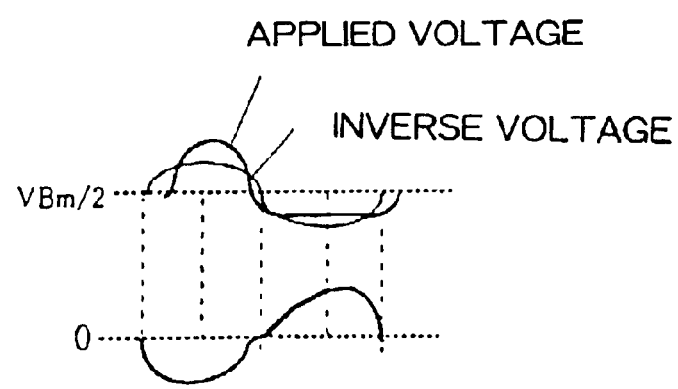

That is, when VBm:VBs=2:1, then as shown on the left of FIG. 4(a), an applied voltage waveform and an inverse voltage waveform suffer from distortion of basically the same shape, and motor coil current is also dependent on applied voltage.

However, if VBm:VBs=3:1, then as shown in FIG. 4(b), applied voltage and inverse voltage are distorted and distortion also arises in motor current flowing as a result. Therefore, current is not allowed to flow in a phase giving maximum output and maximum efficiency.

Figure 5:
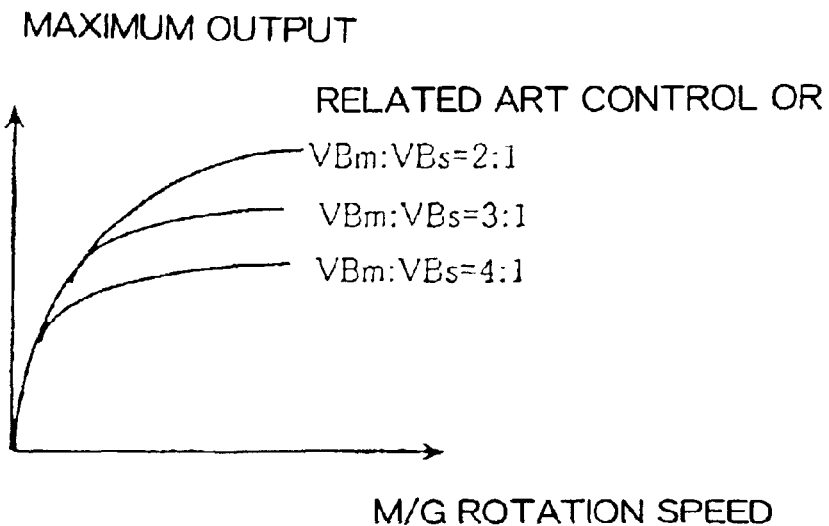
FIGS. 5(a) and 5(b) are drawings showing maximum output and efficiency.
Figure 5:
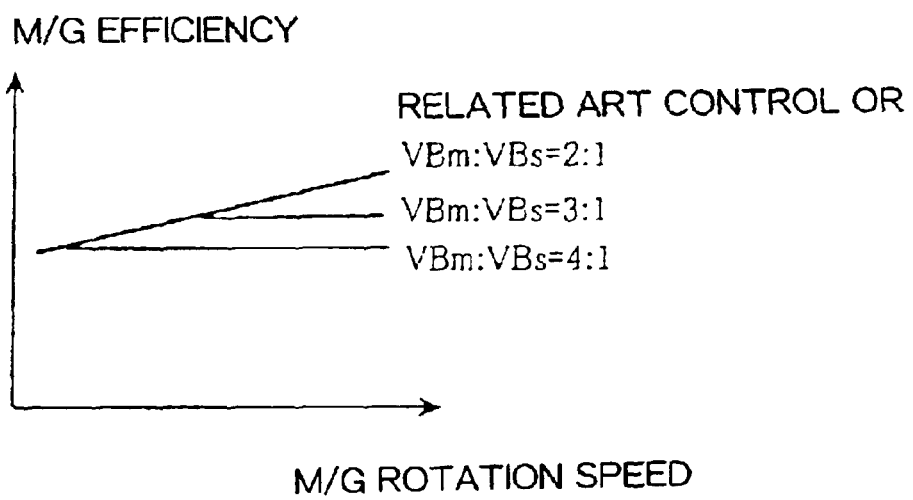

As a result, as shown in FIG. 5, with a power supply system with a voltage ratio that is not 2:1, once rotation speed becomes a specified level or greater, maximum output (FIG. 5(a)) and maximum efficiency (FIG. 5(b)) at the same current are decreased. In particular, lowering of maximum output and efficiency begins quickly and decreases significantly as the voltage ratio moves away from 2:1.

Specifically, in a dual power source system with a voltage ratio of 3:1, if rotation speed is a specified speed or higher then maximum output and efficiency at the same current will be lowered. Further, if the voltage ratio becomes 4:1 the maximum output and efficiency are lowered further, and the system becomes overburdened. In the event of normal motor drive, particularly the motor generator 14 for a vehicle, a voltage ratio of 4:1 can be considered the practical limit for the system.

With this embodiment, the high output load (in this case the motor generator 14) is driven by the 42V high voltage system, and various vehicle mounted components (ancillary devices) are driven in the 14V low voltage system the same as with related ancillary device batteries for a vehicle. This means that lowering of maximum output and efficiency are kept within a range that does not cause problems, while effective drive is performed with a reduced current amount when driving the high output load, and it is possible to supply power for low power ancillary devices in the same way as in the related art. That is, power is supplied at an appropriate voltage depending on the device.

In particular, by matching the neutral point voltage of the motor generator 14 to the low voltage battery voltage, it is possible to charge the low voltage battery 20 using the neutral point current, there is an accompanying slight lowering in efficiency but normal drive of the motor generator 14 is maintained, and it is possible to charge two batteries.

Figure 6:
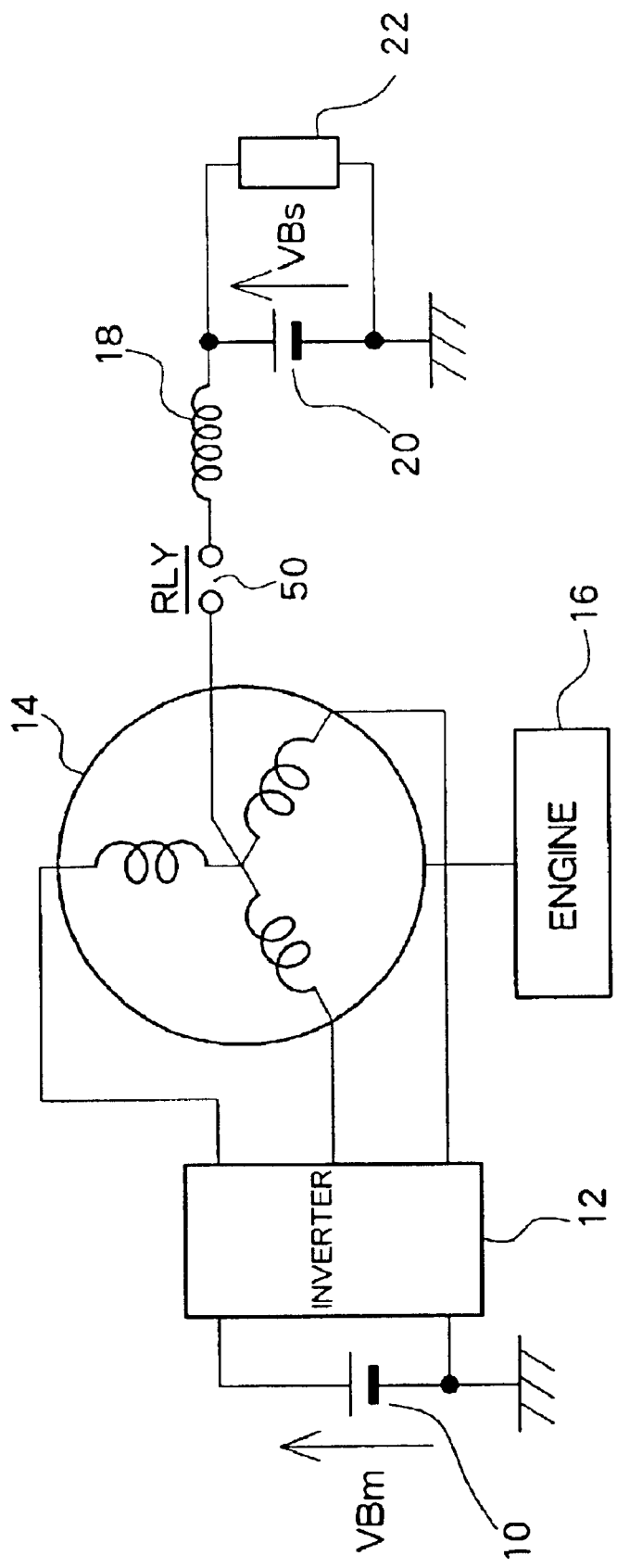
FIG. 6 is a drawing showing the structure of another embodiment.

FIG. 6 is a drawing showing the structure of another embodiment, and in this example there is a relay (RLY) 50 between the neutral point of the motor generator 14 and the reactor 18. This means that it is possible to disconnect the low voltage system from the motor neutral point as required. The relay 50 can also be located between the reactor 18 and the low voltage battery 20.

Figure 7:
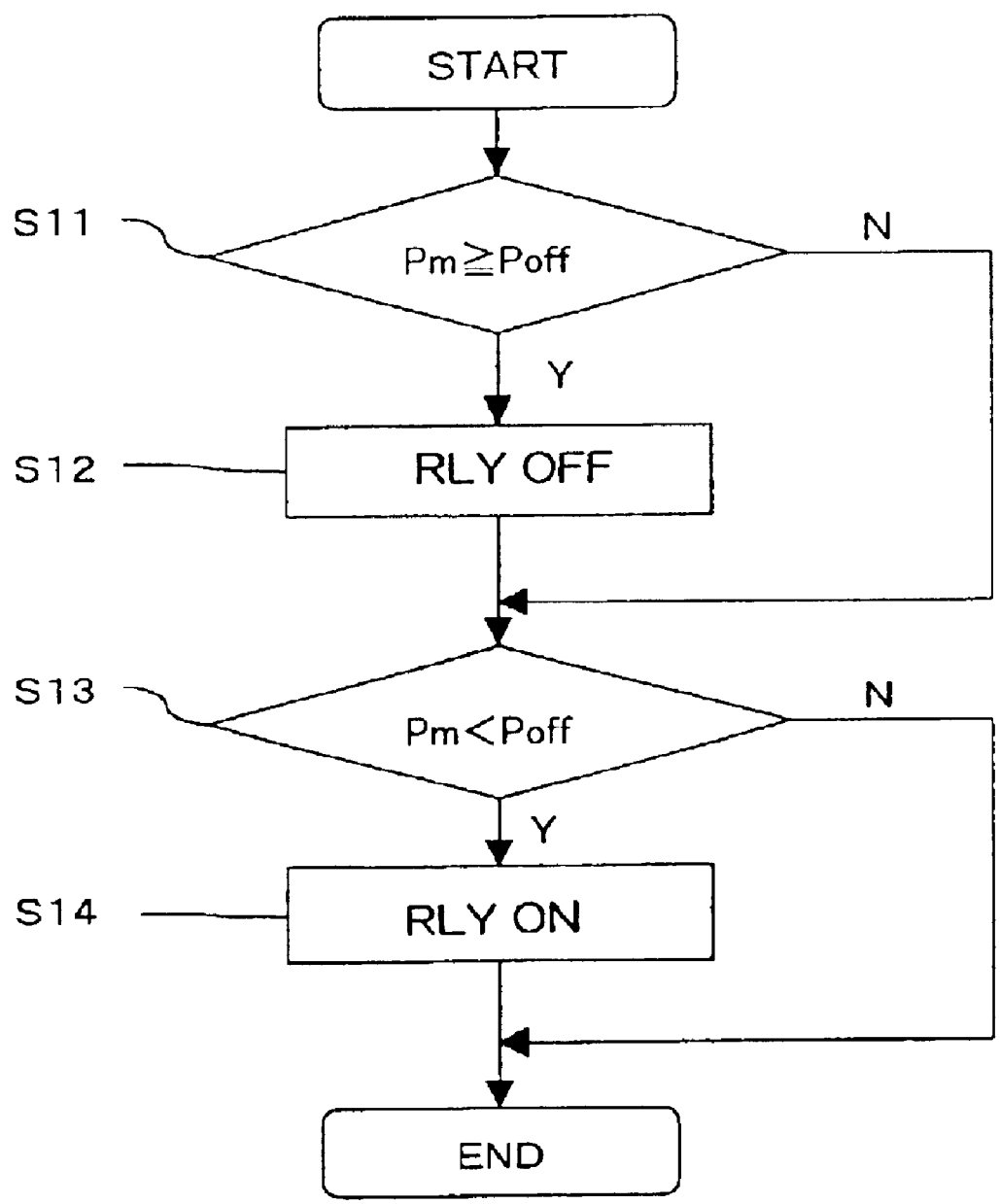
FIG. 7 is a flowchart showing one example of relay on/off control.

FIG. 7 is a flow chart showing one example of on/off control of the relay 50. First of all, it is judged whether or not an output request value Pm for the motor generator 14 is equal to or greater than maximum output Poff when the relay 50 is off(S11). If the result of this judgment is YES, the relay 50 is turned off (S12). As a result, the low voltage system is disconnected from the neutral point. In performing drive control for the motor generator 14, the controller then sets the on period of the upper and lower transistors of the inverter to the same value, and makes the motor neutral point voltage VBm/2. This increases output of the motor generator 14 to give sufficient output.

When the result of the judgment in S11 is NO and processing to turn the relay 50 off in S12 is complete, it is determined whether or not Pm<Poff (S13). If the result of this judgment is YES, since sufficient output can be obtained even with the low voltage system connected, the relay 50 is turned on (S14). In the event that the result of judgment in S13 is NO and the processing of S14 is complete, on/off processing for the relay 50 is terminated and processing returns to the processing from S11.

In this way, if a large output is not obtained from the motor generator 14, the low voltage system is disconnected and sufficient power is supplied to the motor generator 14 from the high voltage system. This makes it possible to obtain maximum output for the motor generator 14.

Figure 8:
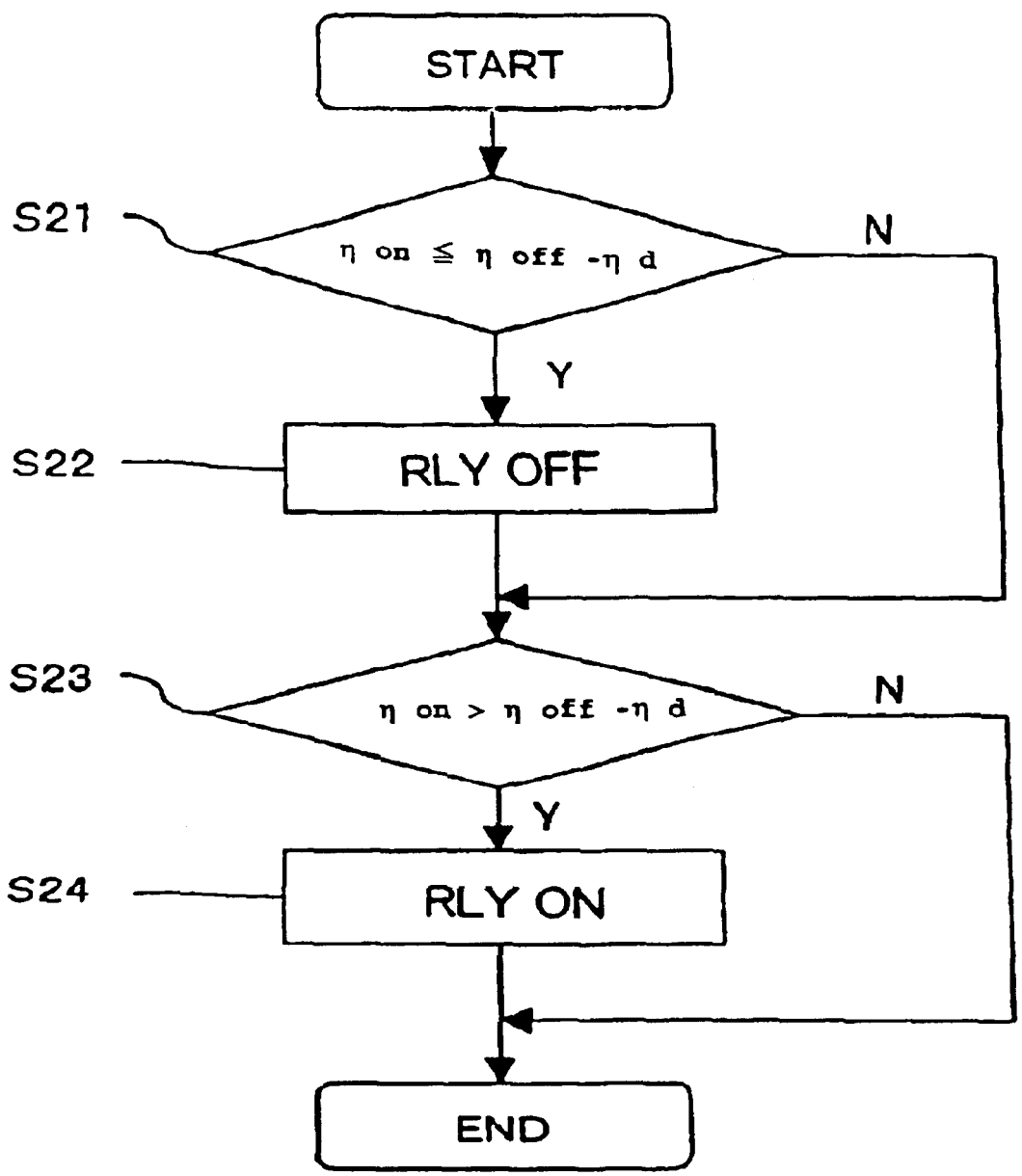
FIG. 8 is a flowchart showing another example of relay on/off control.

FIG. 8 is a flow chart showing another example of on/off control for the relay 50. First of all, it is judged whether or not operating efficiency η on of the motor generator 14 when the relay 50 is on is less than or equal to a specified threshold value ηd subtracted from operating efficiency η off when the relay 50 is off (S21). If the result of this judgment is YES, the relay 50 is turned off (S22). As a result, the low voltage system is disconnected from the neutral point. In drive control for the motor generator 14, the controller makes the motor neutral point voltage VBm/2, making it possible to drive the motor generator 14 with optimum efficiency. If the result of the judgment is NO in S21 and processing to turn off the relay 50 in S22 has been completed, it is determined whether or not ηon>ηoff−ηd (S23). If the result of this judgment is YES, since sufficient efficiency can be obtained even with the low voltage system connected, the relay 50 is turned on (S24). If the result of judgment in S23 is NO and the processing of S24 has been completed, on/off processing for the relay 50 is completed and returns to the processing from S11.

In this way, if the efficiency of the motor generator 14 deteriorates to below a specified value, the low voltage system is disconnected and power is supplied to the motor generator 14 from the high voltage system, making it possible to obtain maximum efficiency of the motor generator 14.

ηd is a set value for permissible efficiency degradation, and is either determined in a range in which charging of the low voltage battery 20 is not affected, or determined according to a detected value while detecting a charging state of the low voltage battery 20. That is, if the relay 50 is turned on for a long time, it becomes impossible to charge the low voltage battery 20 and there is a high possibility that the low voltage battery 20 will become weak. For this reason ηd is preferably determined to be in a range in which charged states of the high voltage battery 10 and the low voltage battery 20 are not affected, or determined while detecting the charged states of the high voltage battery 10 and the low voltage battery 20. In this way, by changing ηd according to the charged state of the batteries, appropriate control can be carried out according to conditions at that time. It is also possible to take in to consideration the high voltage battery 10 and the remaining amount of fuel for driving the generator engine.

It is also possible to combine the above described maximum output and efficiency conditions and to previously hold the operating points (for example rotational speed, torque, d.c. voltage etc.) of the motor generator 14 at which the relay 50 is to be switched as a map, and to perform switching according to control states of the motor generator 14.

For example, if a motor generator 14 mechanically linked to an engine 16 of a hybrid vehicle fitted with a two power source system (42V–14V) is assumed, the motor generator 14 performs operations such as cranking, regeneration and power generation. On the other hand, among these operations, it can be considered that an effect of turning the relay 50 off will be largest at the time of regeneration. This is because during regeneration rotational speed and torque of the motor generator 14 are large. It is therefore preferable to turn the relay 50 off only at regeneration time. Specifically, by turning the relay 50 off at regeneration time and turning it on at other times, it is possible to effectively charge the high voltage battery 10 with simple control.

Figure 9:
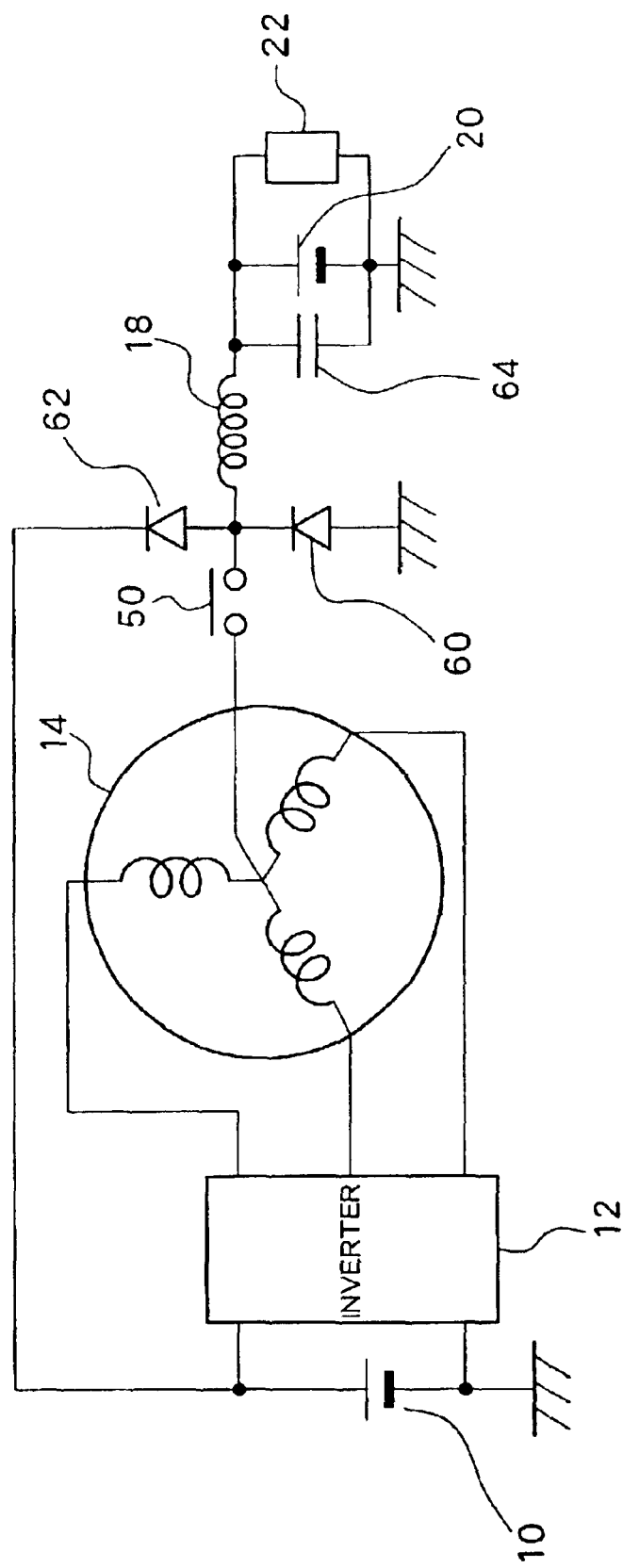
FIG. 9 is a drawing showing the structure of yet another embodiment.

FIG. 9 shows another example structure, in which a power supply line (between a motor neutral point and a reactor 18) of a low voltage system and earth are connected using a diode 60 through which current from the earth side flows, and a power supply line of the low voltage system is connected to a positive electrode of a high voltage battery 10 using a diode 62 through which current from the low voltage side to the high voltage side flows. In this way, when voltage of the low voltage system is lowered due to surge voltage at the time of turning the relay 50 on and off this is alleviated by current from earth, or if the voltage of the low voltage system becomes a higher voltage it is possible to absorb the surge by return to the high voltage battery 10.

Further, in FIG. 9, a capacitor 64 is arranged in parallel with the low voltage battery 20. It is therefore possible to prevent variation in the power source voltage of the low voltage using this capacitor 64.

Figure 10:
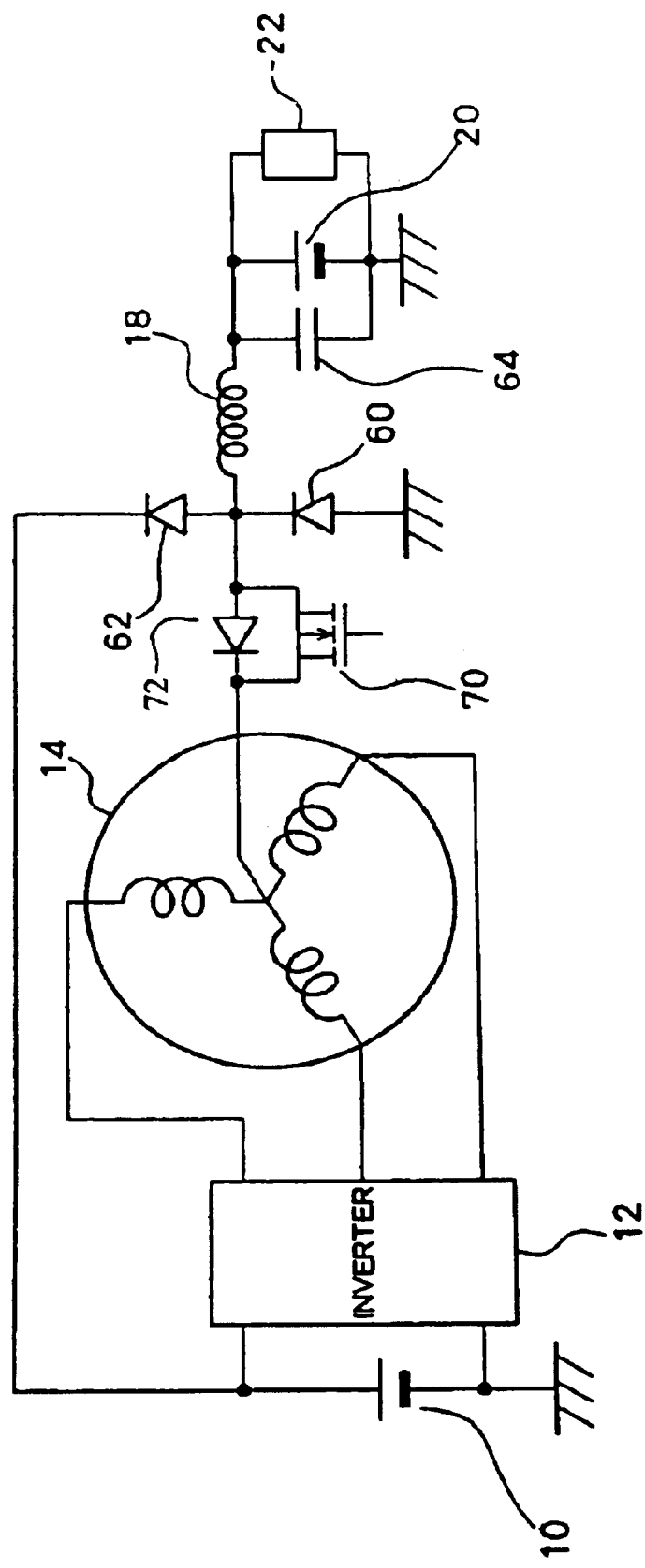
FIG. 10 is a drawing showing the structure of yet another embodiment.

FIG. 10 shows yet another structural example, in which a MOS transistor 70 is adopted instead of the relay 50. A diode 72 is provided so that current does not flow from the neutral point side to the low voltage system when the MOS transistor 70 is off. This diode 72 is normally a parasitic diode of the MOS transistor 70. The same effects as for the relay 50 described above can also be obtained using the MOS transistor, which is a semiconductor switch.

Figure 11:
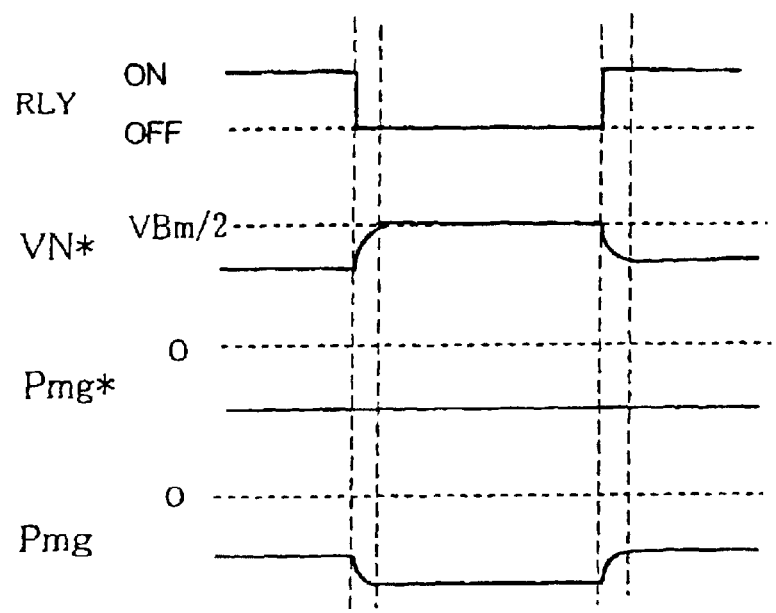
FIG. 11 is a timing chart showing operation at the time of relay on/off control.

FIG. 11 is a timing chart showing switching control for the relay (RLY) 50. By turning the relay 50 off, a neutral point voltage command VN* is gradually made to climb to VBm/2. At this time, if an output command Pmg* of the motor generator 14 is the same, the output Pmg of the motor generator 14 changes with change in the neutral point voltage. Direction of output variation is opposite, but this phenomenon is also the same when the relay 50 is on. Specifically, when the relay is turned on or off, change arises in the output of the motor generator 14 accompanying change in the neutral point voltage. For example, with a hybrid vehicle there is influence from change in engine speed etc.

Figure 12:
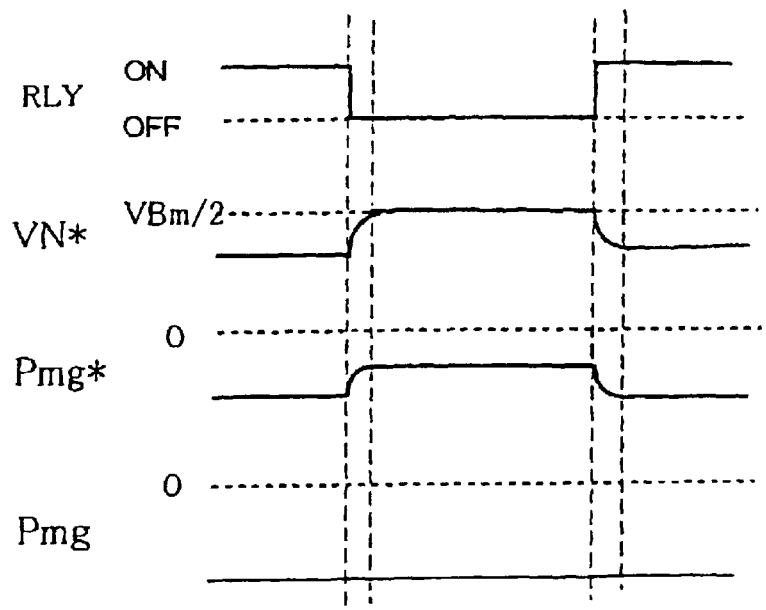
FIG. 12 is a timing chart showing operation at the time of relay on/off control.

FIG. 12 is a timing chart for the case of implementing a structure for preventing this type of output variation. With this example, output command Pmg* of the motor generator 14 is changed, and the occurrence of variation in output of the motor generator 14 is prevented. That is, when the relay 50 is turned on or off, control is performed so that change in neutral point voltage is at a predetermined time constant, and this characteristic is stored. The output command Pmg* is then changed so as to compensate for the effect this change in neutral point voltage has on the motor generator 14. It is preferable to hold a map storing output command values for respective motor output when turning the relay 50 on or off, and to control output command Pmg* based on this map. If it is possible to control switching of the inverter 12, it is also possible to hold a map storing current command values for each phase it In doing this, as shown in the drawings, it is possible to prevent the occurrence of change in output Pmg accompanying the relay 50 being turned on or off.

Also, in a state where current of an auxiliary load connected to the low voltage battery 20 flows, if the relay 50 is repeatedly turned on and off there is a problem with durability of the relay 50. It is therefore preferable to perform control so that the neutral point current becomes 0 immediately before relay switching.

Figure 13:
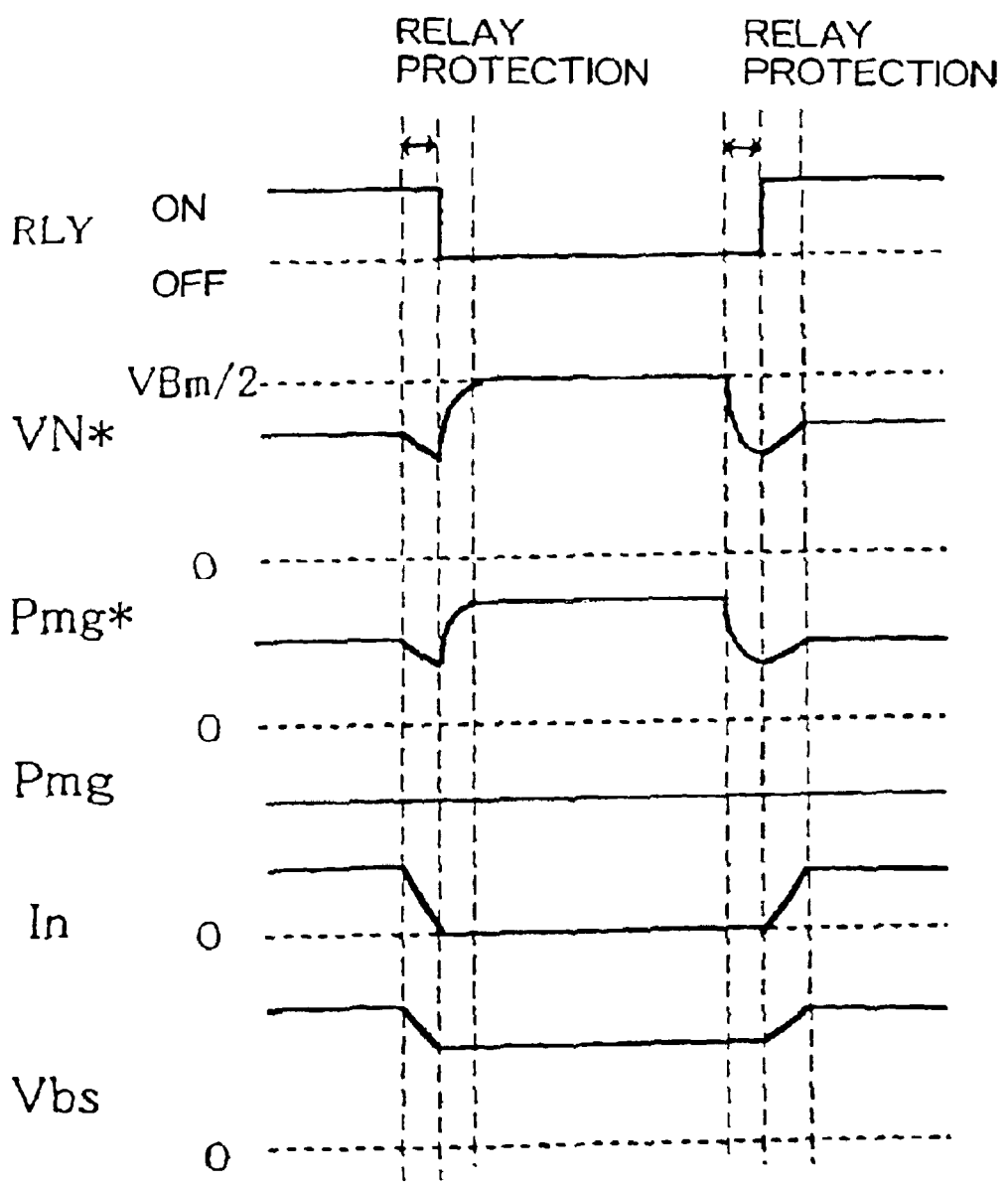
FIG. 13 is a timing chart showing operation at the time of relay on/off control.

Specifically, as shown in FIG. 13, neutral point voltage command VN* and motor generator 14 output command Pmg* are controlled in the period immediately before turning the relay on or off, and feedback control is performed so that neutral point current becomes 0. The relay 50 is then turned on or off when the neutral point current is 0. In this way, it is possible to prolong the life of the relay 50, and to reduce the size and cost.

Figure 14:
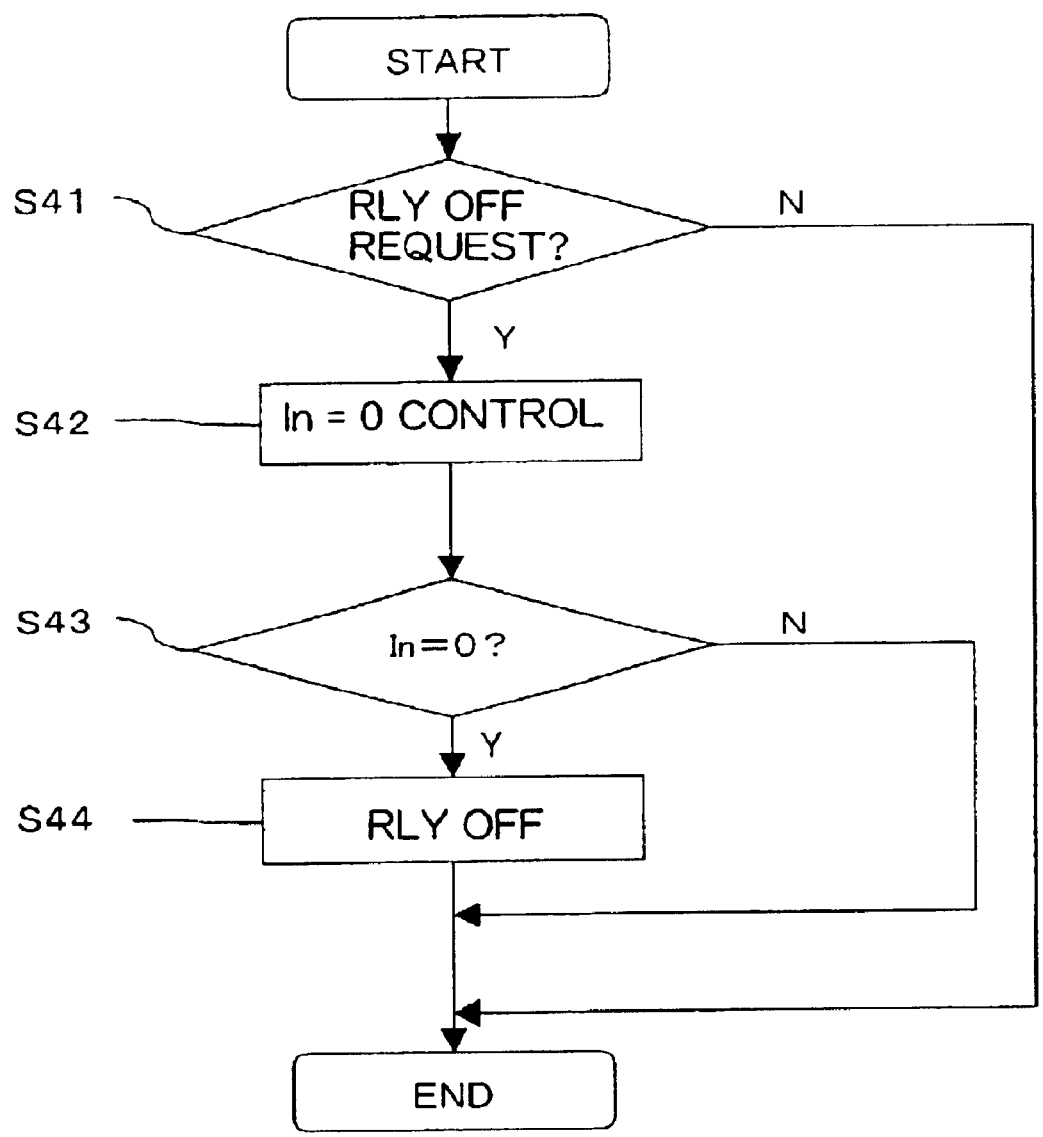
FIG. 14 is a flowchart showing another example of relay on/off control.

An example of control when turning the relay off is shown in FIG. 14. First of all, it is determined whether or not there is a request to turn the relay 50 off (S41), and if there is such a request, control to make neutral point current In=0 is carried out (S42). It is then determined whether or not the neutral point current In=0 (S43), and if the determination is YES the relay 50 is turned off (S44). If the determination in S41 or S43 is No, processing is terminated and returns to S41.

Figure 15:
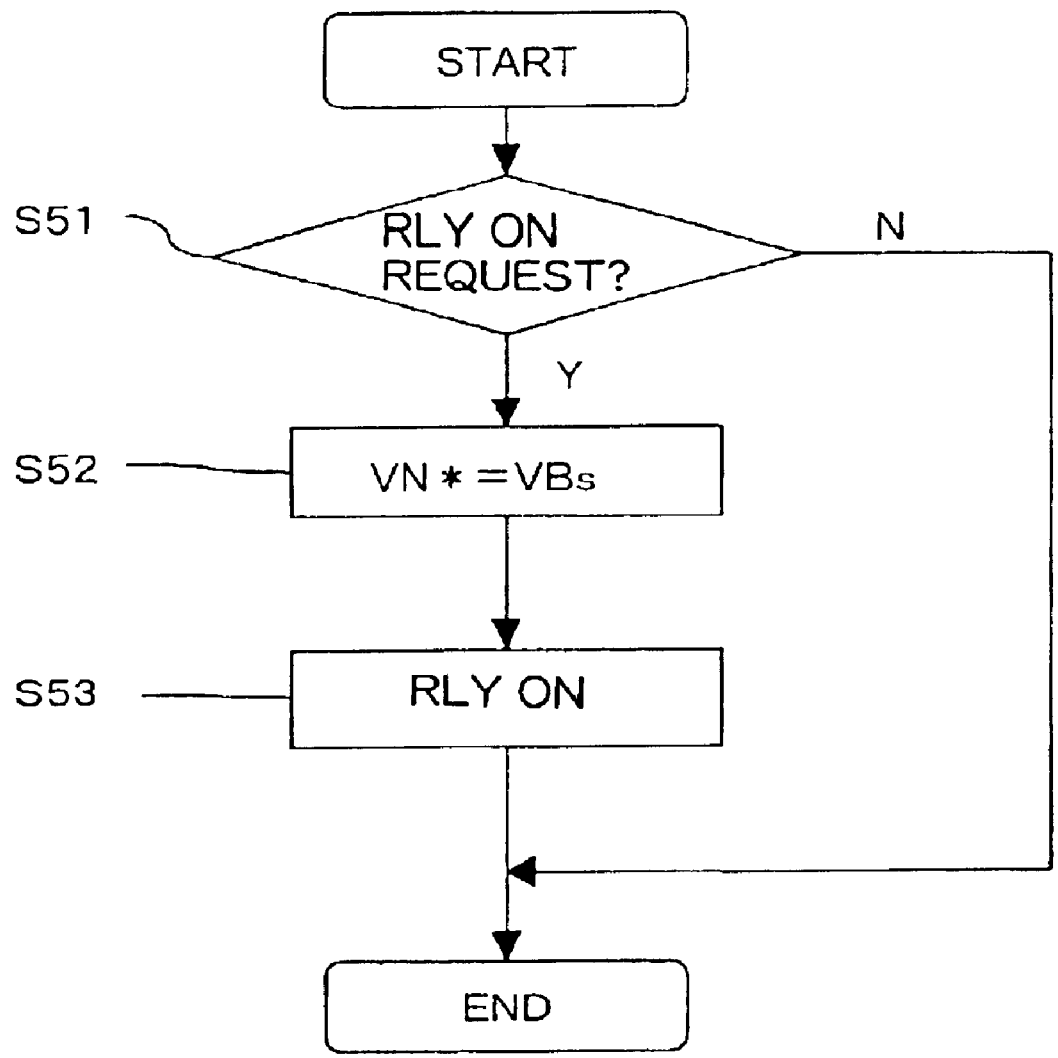
FIG. 15 is a flowchart showing another example of relay on/off control.

FIG. 15 shows processing when turning the relay 50 on. First of all, it is determined whether or not there is a request to turn the relay 50 on (S51). If the determination is YES, control to make neutral point voltage command VN*=VBs (voltage of low voltage batter 20) is carried out (S52) and after that the relay 50 is turned on (S53). In this way, feedback control of the neutral point current is carried out when turning the relay 50 on, and it is possible to make current though the relay 50 when the relay is turned on 0.

Further, when carrying out this control, by controlling motor generator 14 output command Pmg* as shown in FIG. 12, it is possible to eliminate output variation of the motor generator 14. It is also possible with this control to prevent rise in the low voltage side source voltage at the instant of switching the relay 50 from off to on.

Figure 16:
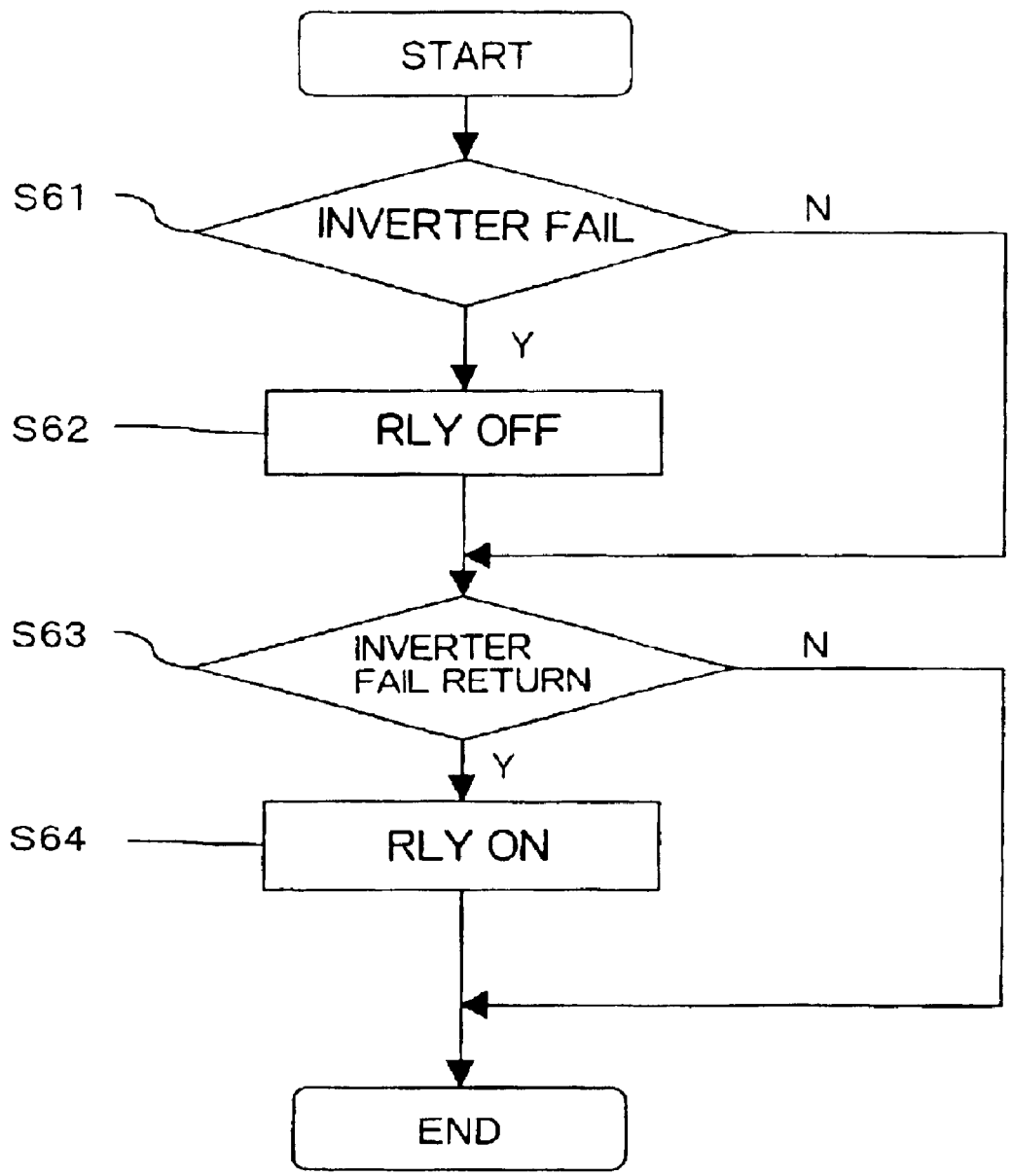
FIG. 16 is a flowchart showing another example of relay on/off control.

FIG. 16 shows another control example. Control is shown in the case where control of neutral point voltage becomes impossible due to inverter failure or control system faults. First of all, it is determined whether or not there is an inverter failure (or control system fault) (S61). If the determination is yes, the relay 50 is turned off (S62). Once the processing of S62 is completed, or if the result of the determination in S61 is NO, it is determined whether or not restoration has been achieved from the inverter failure (or control system fault) (S63). If the result of this determination is YES the relay is turned on (S64). Once processing of S64 is completed, if the result of determination in S63 is NO, processing is completed and returns to S61.

In this way, in the event that it is impossible to control neutral point voltage, it is possible to turn the relay 50 off to prevent application of high voltage to the low voltage source system, and to provide overvoltage protection and short circuit protection for the load.

Figure 17:
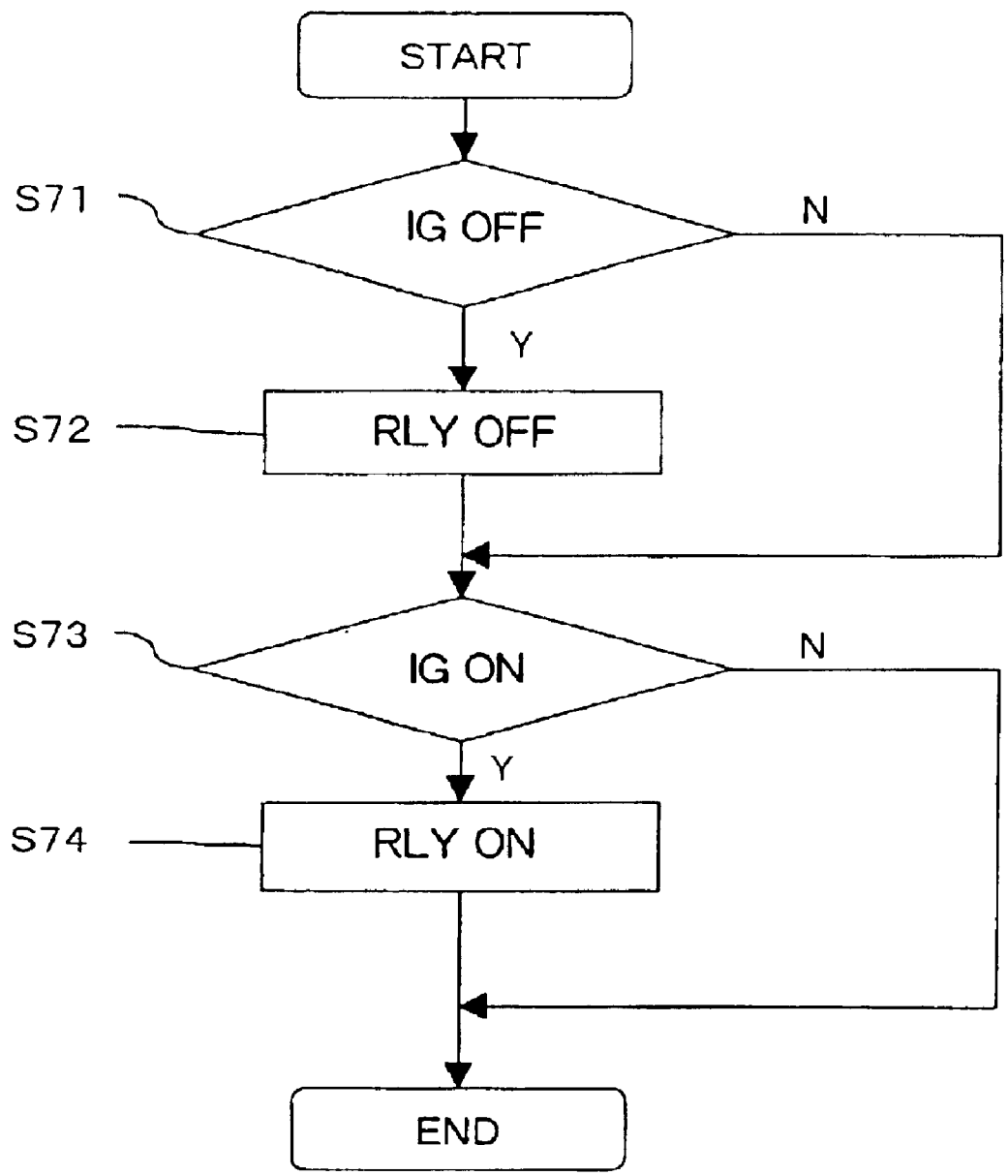
FIG. 17 is a flowchart showing another example of relay on/off control.
Figure 18:
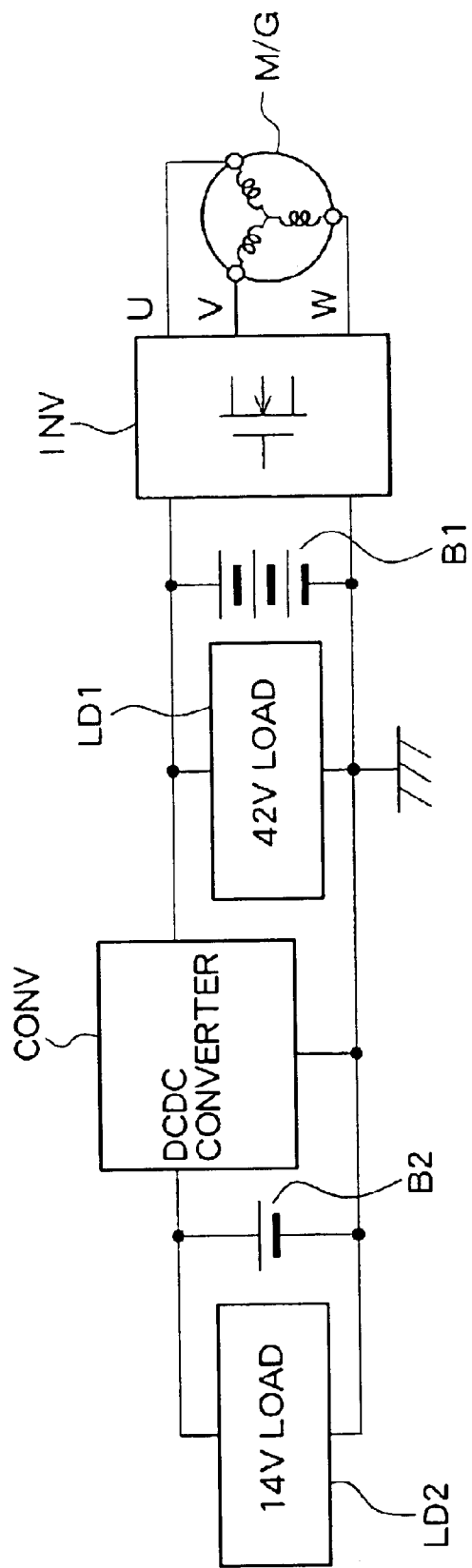
FIG. 18 is a drawing showing the structure of a related art example.

FIG. 17 is control when turning IG off. First of all, it is determined whether or not IG is off (S71) and if the determination is YES the relay is turned off (S72). Once the processing of S72 is completed or if the result of determination in S71 is NO, it is determined whether or not IG is ON. If the result of this determination is YES, the relay 50 is turned on (S74). Once processing of S74 is completed or if the result of determination in S7 is NO, processing is completed and returns to S71.

In this way, in the event that IG is off, the danger of applying an abnormal voltage to the low voltage side is avoided by isolating the neutral point and the low voltage side, and it is possible to carry out control erring on the side of safety.

The above described inverter and relay control is carried out using an ECU (electronic control unit) for controlling operation of this power supply system. Also, in the above described examples, a 3-phase motor has been used as the motor generator 14 but this is not limiting, and it is also possible to use 2-phase motors or motors of 4 or more phases. It is also possible to use not only MOS transistors as switching elements of the inverter 12, but also IGBTs etc.

As described above, by having a high voltage system and a low voltage system, it is possible to obtain an appropriate source voltage according to the load to be driven, and to effectively drive the load. By then connecting the high voltage system with the low voltage system using an a.c. motor there is no need for a DCDC converter which lead to simplification of the system and enable lower costs. Further, by setting a voltage ratio of the low voltage system to the high voltage system in a range from about 1:2 to about 1:4, it is possible to maintain effective drive of the a.c. motor. Particularly, by controlling current supply to the a.c. motor using an inverter, it is possible to effectively control neutral point voltage.

Also, by providing a relay in the low voltage system supply path, it is possible to disconnect the low voltage system as required, and to maintain efficient drive of the a.c. motor.

What it is claimed is:

1. A power supply system, provided with a high voltage system and a low voltage system, comprising:
   an a.c. motor that is a load on the high voltage system and is driven by a high voltage power source;
   an inverter for controlling supply of power to the a.c. motor;
   a low voltage system supply path for applying a neutral point voltage of the a.c. motor to a load of the low voltage system; and
   a load of the low voltage system for connecting to the low voltage system supply path, wherein:
   a voltage ratio of the low voltage system to the high voltage system is set to from 1:2 to 1:4; and
   the inverter is controlled so that an a.c. component in output from the inverter is not sinusoidal in shape, but follows a current distortion phenomena.

2. The power supply system of claim 1, wherein the voltage ratio of the low voltage system to the high voltage system is set at a specified value between 1:2 and 1:4 by controlling the supply of power to the a.c. motor.

3. The power supply system of claim 1, wherein a voltage ratio of the low voltage system to the high voltage system is 1:3.

4. The power supply system of claim 1 wherein the a.c. motor is a motor for generating vehicle traveling force or a motor for starting an engine.

5. The power supply system of claim 1, further comprising:
   a relay for opening and closing the low voltage supply path; and
   determining means for determining whether or not inverter control for making the voltage ratio a specified value is appropriate, wherein if it is determined by the determining means that control is inappropriate, the relay is opened.

6. The power supply system of claim 5, wherein the determining means determines whether or not the a.c. motor is capable of attaining the required output force.

7. The power supply system of claim 6, wherein the determining means determines whether or not efficiency of the a.c. motor is as specified or better.

8. A power supply system, provided with a high voltage system and a low voltage system, comprising:
   an a.c. motor that is a load on the high voltage system and is driven by a high voltage power source;
   an inverter for controlling supply of power to the a.c. motor;
   a low voltage system supply path for applying a neutral point voltage of the a.c. motor to a load of the low voltage system;
   a load of the low voltage system for connecting to the low voltage system supply path, wherein a voltage ratio of the low voltage system to the high voltage system is set to from 1:2 to 1:4;
   a relay for opening and closing the low voltage supply path; and
   determining means for determining whether or not inverter control for making the voltage ratio a specified value is appropriate, wherein if it is determined by the determining means that control is inappropriate, the relay is opened,
   wherein when opening or closing the relay, a motor output command is changed so as to control a.c. motor output variations attributable to variations in neutral point voltage based on opening and closing of the relay.

9. A power supply system, provided with a high voltage system and a low voltage system, comprising:
   an a.c. motor that is a load on the high voltage system and is driven by a high voltage power source;
   an inverter for controlling supply of power to the a.c. motor;
   a low voltage system supply path for applying a neutral point voltage of the a.c. motor to a load of the low voltage system;
   a load of the low voltage system for connecting to the low voltage system supply path, wherein a voltage ratio of the low voltage system to the high voltage system is set to from 1:2 to 1:4;
   a relay for opening and closing the low voltage supply path; and
   determining means for determining whether or not inverter control for making the voltage ratio a specified value is appropriate, wherein if it is determined by the determining means that control is inappropriate, the relay is opened,
   wherein, when opening or closing the relay, the relay is opened or closed after controlling the neutral point voltage to zero.

10. A power supply system, provided with a high voltage system and a low voltage system, comprising:
    an a.c. motor that is a load on the high voltage system and is driven by a high voltage power source;
    an inverter for controlling supply of power to the a.c. motor;
    a low voltage system supply path for applying a neutral point voltage of the a.c. motor to a load of the low voltage system;
    a load of the low voltage system for connecting to the low voltage system supply path, wherein a voltage ratio of the low voltage system to the high voltage system is set to from 1:2 to 1:4;
    a relay for opening and closing the low voltage supply path; and
    determining means for determining whether or not inverter control for making the voltage ratio a specified value is appropriate, wherein if it is determined by the determining means that control is inappropriate, the relay is opened,
    the power supply system having a current return diode, connected from the low voltage system to the high voltage system, for returning power from the low voltage system to the high voltage system.

11. A power supply method, in system having an a.c. motor driven by a high voltage power source, and an inverter for controlling supply of power to the a.c. motor, provided with a high voltage system and a low voltage system for connecting a neutral point of the a.c. motor to a load of the low voltage system as a low voltage system power source, wherein:

a voltage of the low voltage system is made a specified value of between ½ to ¼ of the voltage of the high voltage system, and the inverter is controlled so that an a.c. component in output from the inverter is not sinusoidal in shape, but follows a current distortion phenomena, and that the current distortion phenomenon is caused in the generated voltage waveform at least at the time of motor generation.

12. The power supply method of claim 11, wherein supply of power to the a.c. motor by the inverter is controlled so that the voltage ratio of the low voltage system to the high voltage system is a specified value between 1:2 and 1:4.

13. The power supply method of claim 11, wherein a voltage ratio of th low voltage system to the high voltage system is 1:3.

14. The power supply method of claim 11, wherein the a.c. motor is a motor for generating vehicle traveling force or a motor for starting an engine.

* * * * *